United States Patent [19]
Anderson

[11] Patent Number: 5,359,516
[45] Date of Patent: Oct. 25, 1994

[54] LOAD MONITORING SYSTEM FOR BOOMS

[75] Inventor: Thomas M. Anderson, Hugo, Minn.

[73] Assignee: Schwing America, Inc., White Bear, Minn.

[21] Appl. No.: 122,641

[22] Filed: Sep. 16, 1993

[51] Int. Cl.[5] .............................................. G06F 7/70
[52] U.S. Cl. ........................ 364/424.07; 364/556; 364/567; 73/862.581; 212/238; 340/685
[58] Field of Search .................... 73/37, 49.4, 862.51, 73/862.581; 200/83 W; 212/238; 340/665, 666, 685; 364/424.04, 424.07, 508, 556, 567

[56] References Cited

U.S. PATENT DOCUMENTS

| | | | |
|---|---|---|---|
| 3,641,551 | 2/1972 | Sterner et al. | 340/267 |
| 3,902,359 | 9/1975 | Allen | 73/133 |
| 4,222,491 | 9/1980 | Geppert | 340/685 X |
| 5,160,055 | 11/1992 | Gray | 340/685 |
| 5,163,570 | 11/1992 | Mundis et al. | 212/155 |
| 5,187,973 | 2/1993 | Kunze et al. | 73/40.5 R |

Primary Examiner—Jack B. Harvey
Assistant Examiner—Craig Steven Miller
Attorney, Agent, or Firm—Kinney & Lange

[57] ABSTRACT

A system for monitoring the operation of a boom is disclosed. The boom has at least one boom section, with each boom section being supported by an actuator assembly such that a load supported by a particular actuator assembly is representative of operation of a corresponding boom section and of a total load experienced by that boom section. A first parameter is sensed, the first parameter being indicative of a load supported by a first actuator assembly. It is determined from the sensed first parameter when a total load supported by the first actuator assembly exceeds a predetermined value. Information, indicative of one or more occurrences of total loads exceeding the predetermined value, is stored. Based upon the stored information, an output is provided which is indicative of a cause of boom failure.

34 Claims, 2 Drawing Sheets

LOAD MONITORING SYSTEM FOR BOOMS

BACKGROUND OF THE INVENTION

The present invention relates to systems for monitoring the operation of a boom. In particular, the present invention relates to a system for monitoring operation of a boom in which loads on the boom's actuator assemblies are sensed, information based upon the sensed loads is stored, and an output is provided based upon the stored information which is indicative of potential causes of boom failure.

Booms have one or more boom sections which are typically used to lift a load or reach to a particular distant location. Each boom section has a corresponding actuator assembly which supports the boom section as well as any load supported by that boom section. Typically, the actuator assemblies are hydraulic piston/cylinder assemblies. The load supported by individual actuator assemblies and corresponding boom sections, as well as the load caused by the weight of the boom itself, is monitored. The maximum loads that the actuator assemblies and/or boom sections are structurally designed to withstand are generally known by the boom manufacturer. This information may be translated to maximum loads that each of the boom's actuator assemblies and corresponding boom sections can support without exceeding design limitations.

Booms are frequently subjected to work conditions in which loads supported by the boom exceed design limitations. These excessive conditions can be caused for example by lifting excessive loads, by attempting to extend the boom while a section of the boom is pinned against a wall or other obstacle and by a foreign object such as a separate piece of machinery falling on a section of the boom. Abuses such as these occur in construction applications on a daily basis. Frequently, the result is shortened boom life and/or the failure of one or more boom sections or actuator assemblies.

A very common problem experienced by boom manufacturers is that customers frequently deny that a failed boom was subjected to abusive conditions. In lawsuits in which someone was injured by a cracked boom or a boom which has tipped over, boom manufacturers frequently find it difficult to prove that the failure was caused by abuse, and not by a defect in the boom. Also, frequent abuse of booms makes it difficult for boom manufacturers to offer warranties to their customers. Fixing or replacing boom components which have failed as a result of being subjected to excessive loads, as opposed to being the result of manufacturing defects, is typically cost prohibitive.

Even if a boom is not subjected to loads which exceed design limitations, boom components may still experience fatigue failure because of the repetitious nature of boom movements under loaded conditions. Because fatigue failure is dependent upon the total number of cycles experienced by the boom components, and because the manufacturer has no way to determine how many cycles a particular user will put the boom through in a given period of time, predicting when boom components will experience fatigue failure is extremely difficult.

SUMMARY OF THE INVENTION

The present invention is based upon the recognition that a boom monitoring system which senses and records occurrences of loads on the boom's actuator assemblies which exceed predetermined load values offers increased safety, more reliable maintenance scheduling, improved failure analysis and increased accuracy in determining whether a boom warranty is in effect.

The monitoring system of the present invention monitors operation of a boom having at least one boom section, with each boom section being supported by an actuator assembly such that a load supported by a particular actuator assembly is representative of operation of a corresponding boom section and is related to a total load supported by that boom section. A first parameter, related to operation of a first actuator assembly, is sensed. It is determined, from the sensed first parameter, when a total load supported by the first actuator assembly exceeded a predetermined value. Information is stored, the information being indicative of an occurrence of a total load supported by the first actuator assembly which exceeded the predetermined value. Based upon the stored information, an output is provided which can be used to analyze and/or predict possible causes of boom failure.

In preferred embodiments of the present invention, the predetermined value bears a known relationship to a maximum recommended total load for the first actuator assembly and a first boom section. The output then represents one or more occurrences of total loads supported by the first actuator assembly which exceeded the predetermined value. In other preferred embodiments, the output further represents dates and/or times of each of the one or more occurrence of total loads supported by the first actuator assembly which exceeded the predetermined value. In another preferred embodiment, the output represents a maximum total load supported by the first actuator assembly. In yet other preferred embodiments of the present invention, the predetermined value bears a known relationship to a minimum operating total load supported by the first actuator assembly. The minimum operating total load represents a total load which must be exceeded for the first actuator assembly and the first boom section to be in operation. In these preferred embodiments, the output represents a total number of boom cycles experienced by the first actuator assembly and the first boom section. In this preferred embodiment, the output is used to predict fatigue failure of boom components.

DETAILED DESCRIPTION OF THE PREFERRED EMBODIMENTS

A. Boom System 10

Figure 1:
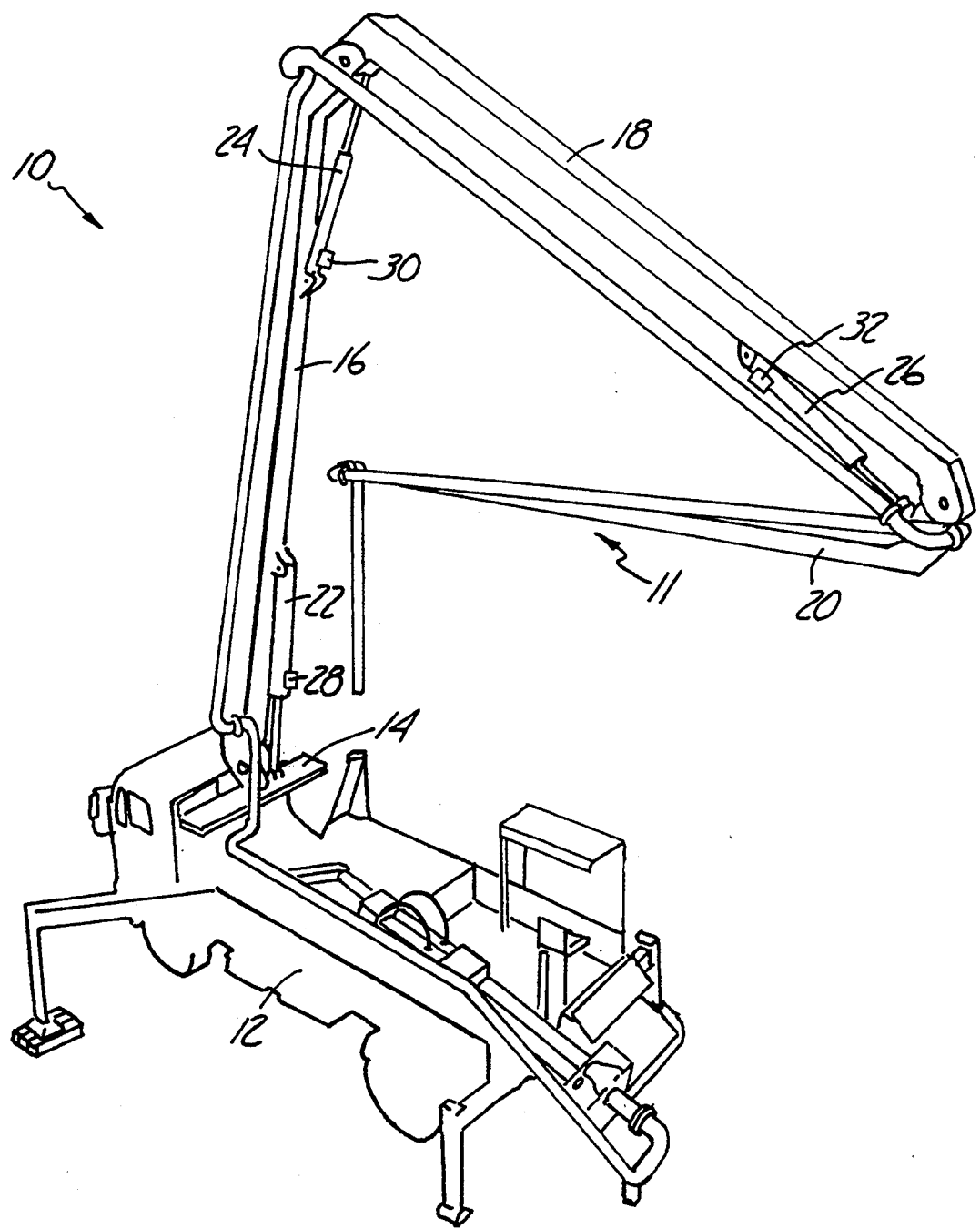
FIG. 1 is a perspective view of a truck mounted boom system in accordance with the present invention.

FIG. 1 shows a perspective view of truck mounted boom system 10. Boom system 10 includes boom 11 and truck 12. Boom 11 includes boom support or base 14, first boom section 16, second boom section 18, third boom section 20, first actuator assembly 22, second actuator assembly 24, third actuator assembly 26, first load sensor 28, second load sensor 30 and third load sensor 32.

Base 14 of boom 11 is mounted on truck 12 to support boom sections 16–20. However, in other preferred embodiments, base 14 is not mounted on truck 12, but rather, is mounted on a more stationary support than truck 12. One end of boom section 16 is pivotally connected to base 14. A second end of boom section 16 is pivotally connected to a first end of boom section 18. Likewise, a second end of boom section 18 is pivotally connected to a first end of boom section 20. Although in the embodiment shown in FIG. 1 boom 11 has three boom sections, in other preferred embodiments boom 11 can include any number of boom sections, with a minimum of one boom section.

Actuator assembly 22 is connected to base 14 and boom section 16 for moving boom section 16 relative to base 14. Actuator assembly 24 is connected to boom sections 16 and 18 for moving boom section 18 relative to boom section 16. Actuator assembly 26 is connected to boom sections 18 and 20 for moving boom section 20 relative to boom section 18.

In preferred embodiments, boom 11 is a hydraulic boom system and actuator assemblies 22–26 are hydraulic actuator assemblies. For example, in the preferred embodiment shown in FIG. 1, boom 11 is a hydraulic boom and actuator assemblies 22–26 are hydraulic piston/cylinder assemblies. However, it should be noted that actuator assemblies 22–26 can be any other type of actuator assembly capable of producing mechanical energy for supporting a load on boom sections 16–20 and for making boom sections 16–20 move relative to one another and relative to base 14. For example, assemblies 22–26 can be a type of hydraulic actuator other than a piston/cylinder assembly. Also, actuators 22–26 can be pneumatic, electrical, or other types of actuators instead of being hydraulic actuators.

Each of load sensors 28–32 sense a parameter, related to the operation of a corresponding one of actuator assemblies 22–26, which is indicative of a total load supported by each of actuator assemblies 22–26. Specifically, load sensor 28 senses a parameter which is indicative of a total load supported by actuator assembly 22. Load sensor 30 senses a parameter which is indicative of a total load supported by actuator assembly 24. Load sensor 32 senses a parameter which is indicative of a total load supported by actuator assembly 26. The total load supported by each of actuator assemblies 22–26 includes a load component caused by the weight of the boom sections themselves as well as a load component caused by the weight of any external load supported by the boom. Additionally, the total load supported by any one actuator assembly is dependent upon the positions of the boom sections relative to one another and upon the position and distribution of the external load supported by boom 11.

In addition to providing an indication of a total load supported by each of actuator assemblies 22–26, information from each of load sensors 28–32 provides an indication of a total load on one of corresponding boom sections 16–20. If one or more of boom sections 16–20 are exposed to load conditions in excess of design limitations, cracks could occur in the overloaded boom sections. Additionally, as boom sections 16–20 are repeatedly extended and retracted under load conditions, the components of boom system 10 are subjected to fatigue stress and may eventually become inoperable or dangerous due to fatigue failure.

In the preferred embodiment illustrated in FIG. 1 in which actuator assemblies 22–26 are hydraulic pistons/cylinder assemblies, load sensors 28–32 are preferably pressure sensors which sense hydraulic pressure in each of the assemblies' hydraulic cylinder. The pressure in a particular hydraulic cylinder is indicative of a total load supported by the corresponding actuator assembly.

Although the present invention is equally applicable to boom systems using actuator assemblies other than hydraulic piston/cylinder assemblies, for ease of illustration, descriptions of preferred embodiments are sometimes limited to booms with hydraulic piston/cylinder actuator assemblies. However, this is not intended to limit the present invention to boom systems with hydraulic piston/cylinder actuators.

B. Monitor System 100

Figure 2:
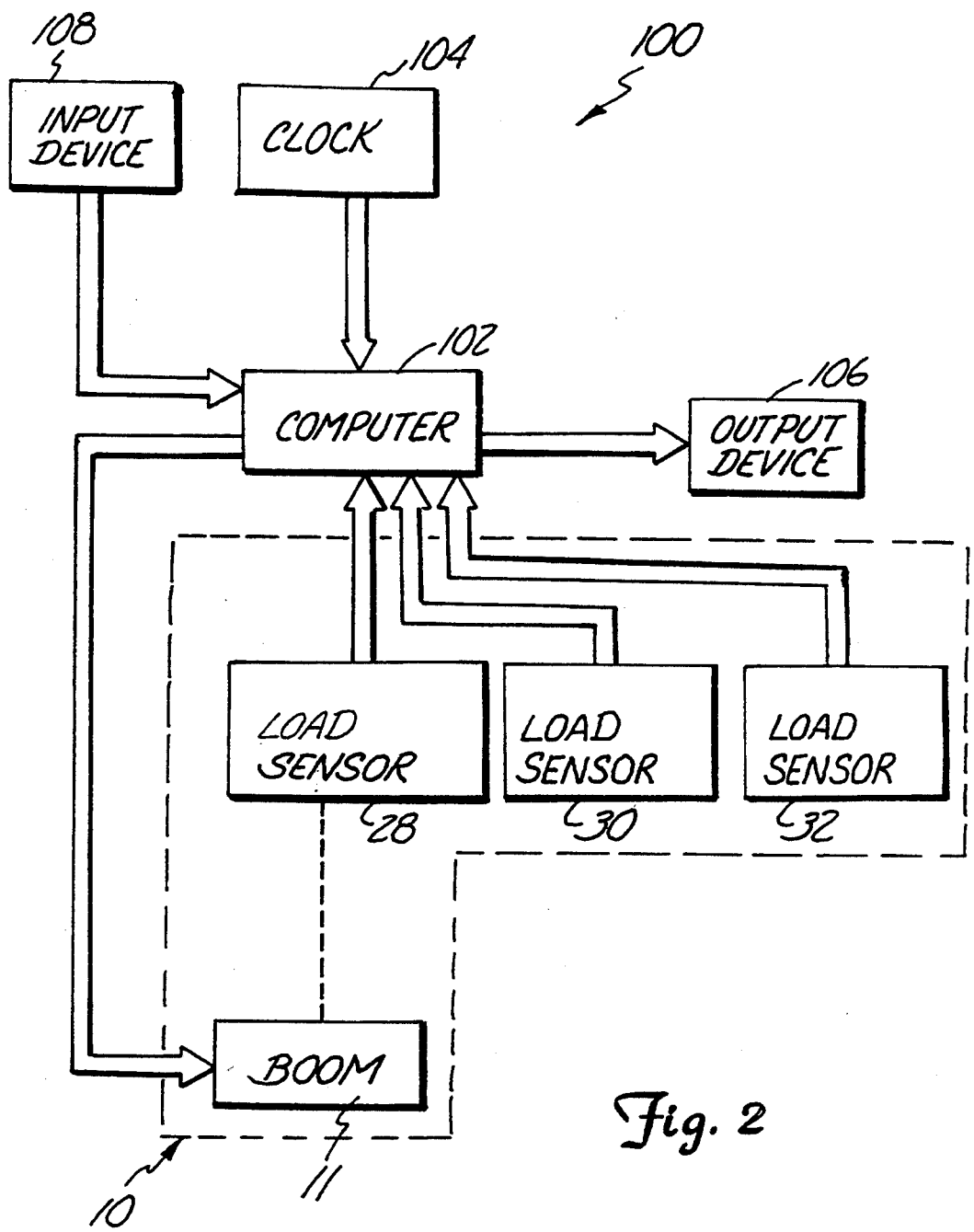
FIG. 2 is a block diagram of a monitoring system for booms in accordance with the present invention.

FIG. 2 shows a preferred embodiment of a monitoring system which monitors the operation of boom system 10 to provide accurate information on the use of boom 11. Monitor system 100 is used to schedule boom maintenance, verify boom warranties and predict or analyze causes of boom failure. Monitor system 100 includes boom system 10, computer 102, clock 104, output device 106 and input device 108.

In preferred embodiments, computer 102 is microprocessor-based computer including associated memory and associated input/output circuitry. However, in other embodiments, computer 102 can be replaced with a programmable logic controller (PLC) or other equivalent circuitry.

Clock 104 provides a time base for computer 102. Although shown separately in FIG. 2, clock 104 may be contained as an integral part of computer 102. In preferred embodiments of the present invention, clock 104 provides computer 102 with date information as well as time information.

Output device 106 is preferably any of a number of devices. For example, output device 106 can include a display output such as a cathode ray tube or a liquid crystal display. Output device 106 can also be a printer, a chart recorder, a remote data storage device, or a communication device such as a cellular phone which transmits the output of computer 102 to another computer-based system which may monitor or control the overall operation in which boom system 10 is being used and/or which may be used to analyze and predict causes of boom failure. Analysis of boom failure is useful for purposes such as trouble-shooting, warranty verification, and proving that no manufacturing defect existed which caused the boom failure.

Input device 108 can also take a variety of forms. In one preferred embodiment, input device 108 is a keypad entry device. Input device 108 can also be a keyboard, a remote program device or any other suitable mechanism for providing information to computer 102.

Once again, load sensors 28, 30 and 32 monitor the loads supported by actuator assemblies 22, 24 and 26, respectively, and provide signals to computer 102 which are indicative of these loads. Although in the preferred embodiment shown in FIG. 1 each of actuator assemblies 22–26 is monitored by a load sensor 28–32, in other embodiments, one or more of actuator assemblies 22–26 is not monitored. For instance, in some embodiments, only the load on actuator assembly 22 is monitored to provide an indication of the total load supported by boom 11.

In the present invention one or more predetermined load values are stored in the memory of computer 102. At least one predetermined load value is stored for each actuator assembly monitored by system 100. However, in preferred embodiments, multiple predetermined load values are stored for each actuator assembly monitored.

In these embodiments, each of the multiple predetermined load values for a particular actuator assembly represents a different degree of loading on the actuator assembly. The significance of the different degree of loading is discussed below.

The predetermined load values may be supplied to computer 102 through input device 108, or may be preprogrammed into the memory of computer 102. In the preferred embodiments of the present invention in which actuator assemblies 22-26 are hydraulic piston/cylinder assemblies and load sensors 28-32 are hydraulic pressure sensors, the predetermined load values are predetermined hydraulic pressure values. In other preferred embodiments in which actuator assemblies 22-26 are not hydraulic piston/cylinder assemblies, the predetermined load values are predetermined values of the parameter sensed which correspond to predetermined loads on one or more of actuator assemblies 22-26. For example, if actuator assemblies 22-26 are electrical actuators, the predetermined values can be current values.

Computer 102, which receives signals from sensors 28, 30 and 32, monitors the load on each of actuator assemblies 22, 24 and 26. Based upon the monitored load supported by each of actuator assemblies 22-26, computer 102 determines when the load on a particular actuator assembly and corresponding boom section has exceeded the one or more corresponding predetermined load values for that assembly.

Computer 102 stores information based upon the sensed loads on one or more of actuator assemblies 22-26. The stored information is indicative of loads on one or more of actuator assemblies 22-26 and is further indicative of loads which have been determined by computer 102 to have exceeded a corresponding predetermined load value. In some embodiments, computer 102 stores information indicative of all loads supported by one or more of assemblies 22-26 and simply notes which loads have exceeded a predetermined load value. In other embodiments, computer 102 only stores information indicative of loads exceeding a predetermined load value. Computer 102 provides an output signal based upon the stored information. Information can later, or simultaneously, be displayed, saved or transferred by output device 106 based upon the output signal provided by computer 102.

In some preferred embodiments of the present invention, for each monitored actuator assembly, computer 102 stores a predetermined load value which bears a known relationship to a maximum recommended total load for the particular actuator assembly and its corresponding boom section. Loads on a particular actuator assembly which exceed the corresponding predetermined maximum load value for a given actuator assembly indicates that the particular actuator assembly and corresponding boom section are supporting a load which exceeds their design limitations. Computer 102 monitors signals from load sensors 28-32 to determine if the load supported by any of actuator assemblies 22-26 has exceeded the corresponding predetermined maximum load value. When a predetermined maximum load value has been exceeded, computer 102 stores information indicative of this occurrence.

In these embodiments, the information stored by computer 102 and provided through output device 106 can be in a variety of formats and may be tailored to provide specifically requested information to a user and/or manufacturer of boom system 10 and monitor system 100. For example, the provided information can simply indicate the occurrence of one or more loads on actuator assemblies 22-26 which exceeded the corresponding predetermined maximum load value. The information provided can specifically identify which of actuator assemblies 22-26 experienced an excessive load, or the information can simply indicate that an excessive load was experienced by one of the assemblies.

The information provided can also be used to indicate a maximum load supported by each of actuator assemblies 22-26 over a given period of time. The maximum load information can identify only the maximum loads, for each actuator assembly, which exceeded the corresponding predetermined maximum load value, or may simply identify the maximum load supported by each of actuator assemblies 22-26 irrespective of whether the maximum load exceeded the corresponding predetermined maximum load value.

In preferred embodiments, clock 104 provides computer 102 with a time base so that computer 102 may store information indicative of the time of each occurrence of a load exceeding a corresponding predetermined load value. The time information may simply indicate a date for each occurrence of an excessive load, or may be more detailed and provide the time of day during each date of occurrence. The stored information is useful in determining exactly when and to what degree boom system 10 was exposed to excessive load conditions. This can be particularly important to boom manufacturers. Boom manufacturers may use this information to schedule boom maintenance and diagnose causes of boom failures. The detailed information allows boom manufacturers to offer warranties on their booms. By accessing the information from computer 102 without output device 106, boom manufacturers may determine if the boom was subjected to excessive conditions and therefore may determine whether the boom warranty is void. Additionally, evidence of a boom being exposed to conditions which exceed its design limitations can be extremely useful during a lawsuit in which the boom manufacturer is being sued for an alleged defect in the boom.

In yet other preferred embodiments of the present invention, at least one predetermined load value for each monitored actuator assembly bears a known relationship to a predetermined minimum operating total load for the respective assembly. The predetermined minimum operating total load for a particular actuator assembly is the load on that assembly which must be exceeded for the assembly and corresponding boom section to be in operation. In other words, each of the predetermined minimum operating load values bears known relationships to minimum loads which must be supported by actuator assemblies 22-26 to lift the corresponding boom sections when boom system 10 is not supporting an external load. The predetermined minimum operating load value for each of assemblies 22-26 is therefore dependent both upon the weight and distribution of weight of boom sections 16-20, and upon the positions of the boom sections relative to one another. Therefore, in preferred embodiments, the predetermined minimum operating load values are values calculated by computer 102 based upon the positions of boom sections 16-20. However, in other embodiments, the predetermined minimum operating load values are constants which sufficiently approximate the necessary minimum loading.

Regardless of whether the predetermined minimum operating load values are constants or variables, in these preferred embodiments, computer 102 monitors the loads on each of actuator assemblies 22-26 for loads exceeding the corresponding predetermined minimum operating load value. Each occurrence of a load on one of actuator assemblies 22-26 which exceeds the corresponding minimum operating load value is indicative of the corresponding actuator assembly and boom section being subjected to a boom cycle.

In preferred embodiments, computer 102 has a register for each of actuator assemblies 22-26 which indicates an overall total number of boom cycles experienced by each assembly and corresponding boom section. Computer 102 updates the corresponding register each time one of actuators assemblies 22-26 supports a load which exceeds the predetermined minimum operating load value. Computer 102 provides to a user of boom system 10 or to the boom manufacturer, through output device 106, an indication of a total number of boom cycles experienced by each of assemblies 22-26. Because each boom cycle subjects components of boom 11 to the fatigue stress, this information can be used by the boom manufacturer to predict fatigue failure on boom components. This is possible because the fatigue life of the boom components, which is the number of repeated stress cycles the boom components can endure before failure, can be determined through life cycle testing. Once again, this information can be used to schedule boom maintenance, to predict or analyze causes of boom failure, and to aid manufacturers in providing and verifying boom warranties.

Although the present invention has been described with reference to preferred embodiments, workers skilled in the art will recognize that changes may be made in form and detail without departing from the spirit and scope of the invention.

What is claimed is:

1. A method of monitoring operation of a boom having at least one boom section, each boom section being supported by an actuator assembly such that a total load supported by an actuator assembly includes a load component caused by a weight of a corresponding boom section and includes a load component caused by any external load supported by the boom, the method comprising:
   sensing a first parameter related to operation of a first actuator assembly, the first actuator assembly being connected to a first boom section for supporting the first boom section, the first parameter being indicative of a total load supported by the first actuator assembly;
   determining from the sensed first parameter when a total load supported by the first actuator assembly exceeds a predetermined value;
   storing information indicative of an occurrence of a total load supported by the first actuator assembly which exceeded the predetermined value;
   providing an output based upon stored information; and
   determining whether a boom warranty is in effect based upon the output.

2. The method of claim 1 wherein storing information further includes storing a date during which a total load supported by the first actuator assembly exceeded the predetermined value.

3. The method of claim 1 wherein storing information further includes storing a time during which the total load supported by the first actuator assembly exceeded the predetermined value.

4. The method of claim 1 wherein storing information further includes storing a magnitude of a total load supported by the first actuator assembly which exceeded the predetermined value.

5. The method of claim 1 wherein storing information further includes storing a maximum total load, supported by the first actuator assembly.

6. The method of claim 1 wherein storing information further includes storing a number of occurrences of total loads supported by the first actuator assembly, each of which exceeded the predetermined value.

7. The method of claim 1 wherein the predetermined value bears a known relationship to a maximum recommended total load for the first actuator assembly.

8. The method of claim 1 wherein the predetermined value bears a known relationship to a maximum recommended total load for the first boom section.

9. A method of monitoring operation of a boom having at least one boom section, each boom section being supported by an actuator assembly such that a total load supported by an actuator assembly includes a load component caused by a weight of a corresponding boom section and includes a load component caused by any external load supported by the boom, the method comprising:
   sensing a first parameter related to operation of a first actuator assembly, the first actuator assembly being connected to a first boom section for supporting the first boom section, the first parameter being indicative of a total load supported by the first actuator assembly;
   determining from the sensed first parameter when a total load supported by the first actuator assembly exceeds a predetermined value;
   storing information indicative of an occurrence of a total load supported by the first actuator assembly which exceeded the predetermined value, wherein storing information includes storing a date during which a total load supported by the first actuator assembly exceeded the predetermined value; and
   providing an output based upon stored information.

10. The method of claim 9 wherein storing information further includes storing a time during which the total load supported by the first actuator assembly exceeded the predetermined value.

11. The method of claim 9 wherein storing information further includes storing a magnitude of a total load supported by the first actuator assembly which exceeded the predetermined value.

12. The method of claim 9 wherein storing information further includes storing a maximum total load supported by the first actuator assembly.

13. The method of claim 9 wherein storing information further includes storing a number of occurrences of total loads supported by the first actuator assembly, each of which exceeded the predetermined value.

14. The method of claim 9 wherein the predetermined value bears a known relationship to a maximum recommended total load for the first actuator assembly.

15. The method of claim 9 wherein the predetermined value bears a known relationship to a maximum recommended total load for the first boom section.

16. The method of claim 9 wherein the first actuator assembly is a first hydraulic piston/cylinder assembly and the first parameter is hydraulic fluid pressure in the first hydraulic piston/cylinder assembly.

17. The method of claim 9 and further comprising:
determining whether a boom warranty is in effect based upon the output.

18. The method of claim 9 and further comprising:
transmitting the output to a location remote from the boom to determine a cause of boom failure.

19. A method of monitoring operation of a boom having at least one boom section, each boom section being supported by a hydraulic piston/cylinder such that hydraulic fluid pressure within a particular cylinder is representative of operation of a corresponding boom section, the method comprising:
sensing a first parameter related to operation of the boom which is indicative of hydraulic pressure in a first cylinder, the first cylinder supporting a first boom section;
determining from the sensed first parameter when hydraulic pressure in the first cylinder exceeds a predetermined value;
storing information based upon the sensed first parameter when hydraulic pressure in the first cylinder is determined to have exceeded the predetermined value; and
providing an output based upon stored information, providing the output including providing a representation of a date of an occurrence of hydraulic pressure in the first cylinder which exceeded the predetermined value.

20. The method of claim 19 wherein the first parameter is hydraulic fluid pressure.

21. The method of claim 19 wherein providing the output further includes providing a representation of a time of day during the date of an occurrence of hydraulic pressure in the first cylinder which exceeded the predetermined value.

22. The method of claim 19 wherein providing the output further includes providing a representation of a maximum hydraulic pressure in the first cylinder during an occurrence of hydraulic pressure in the first cylinder which exceeded the predetermined value.

23. The method of claim 19 wherein providing the output further includes providing a representation of a number of occurrences of hydraulic pressures in the first cylinder, each of the number of occurrences having exceeded the predetermined value.

24. The method of claim 23 wherein providing the output further includes providing a representation of dates of each of the number of occurrences of hydraulic pressures in the first cylinder.

25. The method of claim 24 wherein providing the output further includes providing a representation of a time of day during each of the dates of the number of occurrences of hydraulic pressures in the first cylinder.

26. The method of claim 19 wherein providing the output further includes providing a representation of a maximum hydraulic pressure occurring in the first hydraulic cylinder.

27. The method of claim 26 wherein providing the output further includes providing a representation of a date that the maximum hydraulic pressure occurred.

28. The method of claim 19 wherein providing the output further includes providing a representation of a time during the date that the maximum hydraulic pressure occurred.

29. The method of claim 19 further comprising:
determining whether a boom warranty is in effect based upon the output.

30. A method of monitoring operation of a boom having at least one boom section, each boom section being supported by an actuator assembly such that a total load supported by an actuator assembly includes a load component caused by a weight of a corresponding boom section and includes a load component caused by any external load supported by the boom, the method comprising:
sensing a first parameter related to operation of a first actuator assembly, the first actuator assembly being connected to a first boom section for supporting the first boom section, the first parameter being indicative of a total load supported by the first actuator assembly;
determining from the sensed first parameter when a total load supported by the first actuator assembly exceeds a predetermined value, the predetermined value bearing a known relationship to a minimum operating total load supported by the first actuator assembly;
storing information indicative of an occurrence of a total load supported by the first actuator assembly which exceeded the predetermined value;
providing an output based upon stored information; and
predicting fatigue failure of boom components based upon the output scheduling boom maintenance based upon the output.

31. The method of claim 30 wherein the minimum operating total load represents a total load supported by the first actuator assembly which must be exceeded for the first actuator assembly and the first boom section to be in operation.

32. The method of claim 30 wherein the minimum operating total load represents a minimum total load supported by the first actuator assembly that will result in movement of the first boom section.

33. A method of monitoring operation of a boom having at least one boom section, each boom section being supported by a hydraulic piston/cylinder such that hydraulic fluid pressure within a particular cylinder is representative of operation of a corresponding boom section, the method comprising:
sensing a first parameter related to operation of the boom which is indicative of hydraulic pressure in a first cylinder, the first cylinder supporting a first boom section;
determining from the sensed first parameter when hydraulic pressure in the first cylinder exceeds a predetermined value, the predetermined value bearing a known relationship to a minimum operating hydraulic pressure in the first cylinder, the minimum operating hydraulic pressure representing a hydraulic pressure in the first cylinder which must be exceeded for the first boom section to be in operation;
storing information based upon the sensed first parameter when hydraulic pressure in the first cylinder is determined to have exceeded the predetermined value;
providing an output based upon stored information; and
predicting fatigue failure of boom components based upon the output scheduling boom maintenance based upon the output.

34. The method of claim 33 wherein providing the output comprises providing a representation of a total number of boom cycles experienced by the first boom section.

* * * * *